March 27, 1934.      W. N. GLAB      1,952,430
BY-PASS LINE VALVE
Filed Feb. 6, 1931
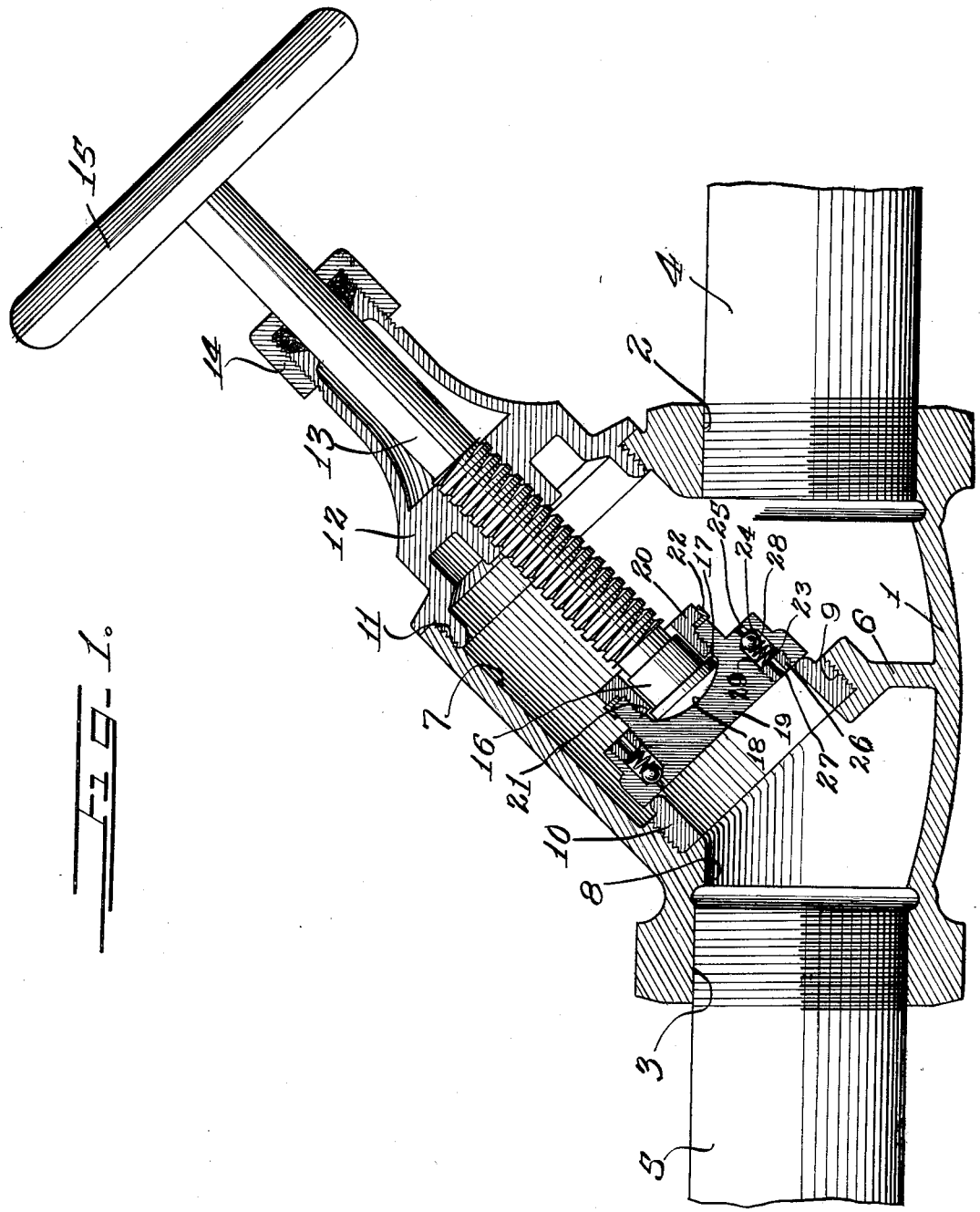
Inventor
William N. Glab.
by Charles T. Wells Attys.

Patented Mar. 27, 1934

1,952,430

UNITED STATES PATENT OFFICE 1,952,430

BY-PASS LINE VALVE

William N. Glab, Dubuque, Iowa, assignor to Morrison Bros., Dubuque, Iowa, a corporation of Iowa Application February 6, 1931, Serial No. 513,919

2 Claims. (Cl. 277—26)

This invention relates in general to a valve, and is more particularly concerned with improved means for by-passing a valve of that type commonly known as line valve.

Heretofore, line valves of the by-pass type have been unidirectional in operation. By virtue of this construction, it has been necessary, when the valve is installed, for the installer to connect the supply pipe to the pipe connection of the valve in communication with the inlet side of the by-pass means in order to render the by-pass valve operative. Obviously, due to the human element involved, this arrangement was not fool-proof for the reason that there was a possibility that the valve might be installed in the reverse position, in which case the by-pass means would be rendered ineffective to relieve the supply line of excessive pressure.

In order to provide a fool-proof by-pass line valve which would not necessitate installation in any particular manner in order to make the by-pass means operative, this invention contemplates the provision of by-pass means in the valve member which is operative regardless of which of the two pipe connections is connected to the inlet or supply pipe.

It is, therefore, a primary object of this invention to provide a line valve having auxiliary or by-pass valves arranged in the valve member in such a manner that an auxiliary passageway or by-pass connection will be established between the inlet and outlet connections of the valve upon the occurrence of abnormal pressure either on the inlet or outlet side of the valve.

It is a further object of this invention to provide a line valve having improved means for establishing a by-pass connection between the inlet and outlet side of the valve, said means being simple in design, positive in operation and economic of manufacture.

The invention comprises the novel structure and combination of parts hereinafter described and more particularly pointed out and defined in the appended claims.

In the accompanying drawing which illustrates a preferred embodiment of this invention and in which similar reference numerals refer to similar features in the different views:

The figure is a vertical sectional view partly in elevation of a valve embodying the features of this invention, taken substantially on the center line of the valve.

As illustrative of this invention, I have chosen to show in the figure a line valve comprising a casing 1 having aligned openings 2 and 3 which are inwardly threaded for engaging the threaded ends of suitable pipe connections 4 and 5. By virtue of the construction of my improved valve, which will subsequently be described in detail, either of the openings 2 and 3 may be connected to the source of supply to the valve without affecting the operation thereof.

The interior of the casing 1 has a member 6 which extends across the interior thereof and separates it into a chamber 7 which is in communication with the opening 2, and a chamber 8 which is in communication with the opening 3. The member 6 is provided with an internally threaded opening 9 for threadedly engaging an annular valve seat 10 which is disposed at an angle to the axes of the openings 2 and 3 and defines a passageway between the chambers 7 and 8.

One side of the casing 1 is provided with an internally threaded opening 11 for threadedly engaging a cap 12 which surrounds and threadedly engages a valve stem 13. The outer end of the cap 12 threadedly engages a stuffing box 14 which surrounds the stem 13 and prevents leakage of the valve along the stem. A hand wheel 15 is secured at the outer end of this stem for manipulating the valve.

An annular collar 16 surrounds and is secured to the inner end of the valve stem 13, this collar being provided with a peripheral flange 17 which lies within a recessed portion 18 of a valve member 19. The outer end of the recessed portion 18 is internally threaded for receiving a bushing 20 which surrounds the collar 16 and forms an inwardly extending shoulder 21 for engagement with the flange 17, whereby the valve member 19 is secured to the stem 13. With this arrangement the collar 16 is free to be rotated within the bushing 20 and recess portion 18, but constrained against longitudinal removal from the recess 18. The bushing 20 is secured against rotational movement relative to the valve member 19 by means of a lock washer 22.

Provision is made for by-passing the main valve 19 by arranging a plurality of auxiliary valves in the valve member 19 in such a manner that, upon the occurrence of abnormal pressure in either chamber 7 or chamber 8, one of these valves will be actuated and establish communication between the chambers. Since the only difference in these valves lies in the fact that certain of them are arranged to respond to abnormal pressure in one of the chambers, whereas the others are arranged to respond to abnormal pressure in the other chamber. For this reason, it is thought that it will be necessary to describe only one of the auxiliary valves.

From one face of the valve member 19, a recess or socket 23 extends into the valve and terminates in a seating surface 24 which in this instance is conical in shape. Extending from the center of this seating surface is a port opening 25 which opens into the other face of the valve member. A plug closure 26 threadedly engages the open end of the socket 23, and is provided with a central aperture 27 which extends longitudinally thereof and connects the interior of the socket with one of the valve chambers. An auxiliary valve member 28, in this instance a ball, is disposed within the socket 23 and held against the seating surface 24 by means of a coil spring 29 which is constrained within the socket by means of the plug 26. By means of this arrangement, the port opening 25 is normally closed by the auxiliary valve member 28 by virtue of the pressure exerted thereagainst by the spring 29. Upon the occurrence of abnormal pressure in the chamber with which the port opening 25 communicates, the auxiliary valve member 28 will be forced away from the port opening and thereby permit fluid in one chamber to pass into the fluid of the other chamber by virtue of the port opening 25, the socket 23 and aperture 27 of the plug 26. As soon as the pressures in the chambers thus connected become substantially normal or equal, the spring 23 will again cause the valve 28 to be moved into a position closing the port opening 25.

It will, therefore, be apparent from the foregoing description, that my invention provides a line valve which is fool-proof and may be installed in the line without the necessity of taking cognizance of whether the supply is connected to one opening or the other of the valve; which is provided with novel auxiliary valves in the valve member for automatically establishing a by-pass through the valve member upon the occurrence of abnormal pressure in one of the pipe connections of the valve; and which is simple in construction, economical of manufacture and positive in operation.

Now, it is, of course, to be understood that although, I have described in detail the preferred embodiment of my invention, the invention is not to be thus limited but only insofar as defined by the scope and spirit of the appended claims.

I claim as my invention:

1. A valve comprising a casing defining inlet and outlet chambers, a main valve seat between said chambers, a main valve member to cooperate with said seat to close the passageway between said chambers, said member having oppositely disposed sockets having bottoms forming seating surfaces, a port opening in the bottom of one of said sockets communicating with the inlet chamber and a port opening in the bottom of the other socket communicating with the outlet chamber, plugs in the outer ends of said sockets, the plug in the one of said sockets having a central opening communicating with the outlet chamber and the plug in the other of said sockets having a central opening communicating with the inlet chamber, auxiliary valve members in said sockets, and resilient means in said sockets to hold said auxiliary valve members against the seating surfaces to close said port openings.

2. A valve comprising a casing defining inlet and outlet chambers adapted for pipe connection, a main valve seat between said chambers, a main valve member cooperatively associated with said seat, rotatable means for actuating said valve member, said means being swivelly connected to said valve member, a plurality of passageways in said valve member interconnecting said chambers, said passageways being independent of said means, and auxiliary valve members to normally close said passageways, one of said auxiliary valves being arranged to automatically open upon the occurrence of normal pressure in one of said chambers, and the other of said auxiliary valves being arranged to automatically open upon the occurrence of abnormal pressure in the other of said chambers so that in installing the valve either one of said connections may be connected to a supply pipe without rendering said valve inoperative.

WILLIAM N. GLAB.